June 17, 1969  A. W. SCHNACKE  3,450,195
MULTIPLE CIRCUIT HEAT TRANSFER DEVICE
Filed March 16, 1967  Sheet 1 of 2
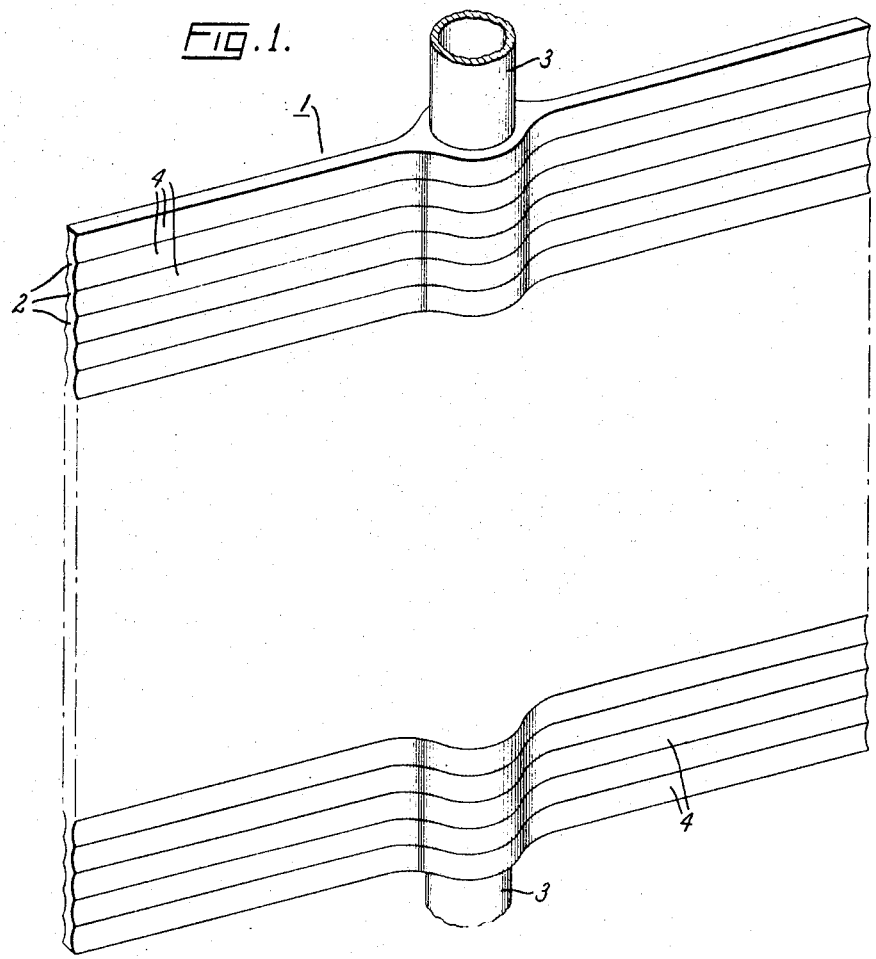
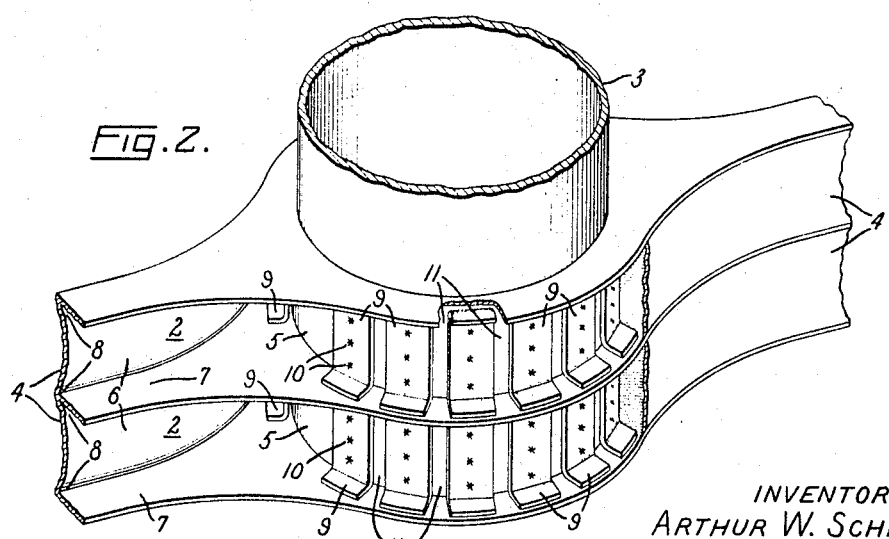
INVENTOR:
ARTHUR W. SCHNACKE,
BY Paul F. Prestia
AGENT

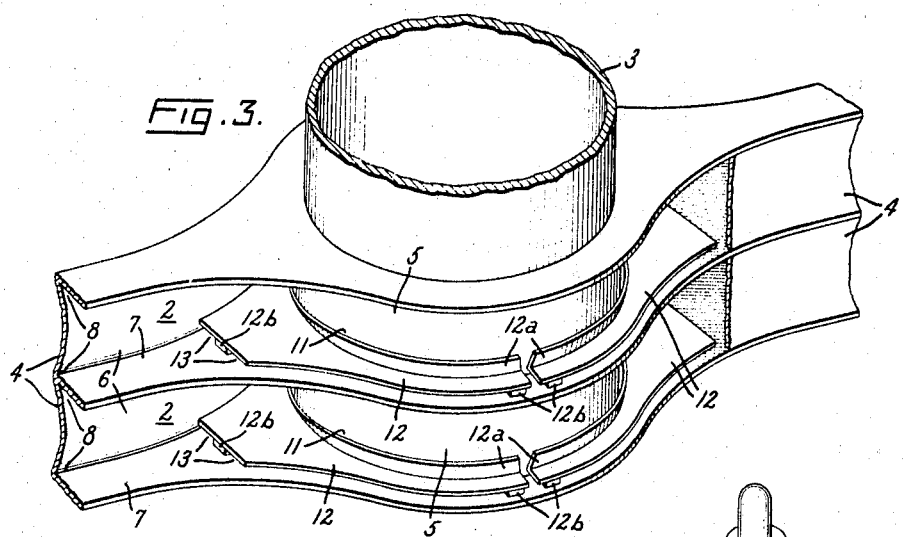
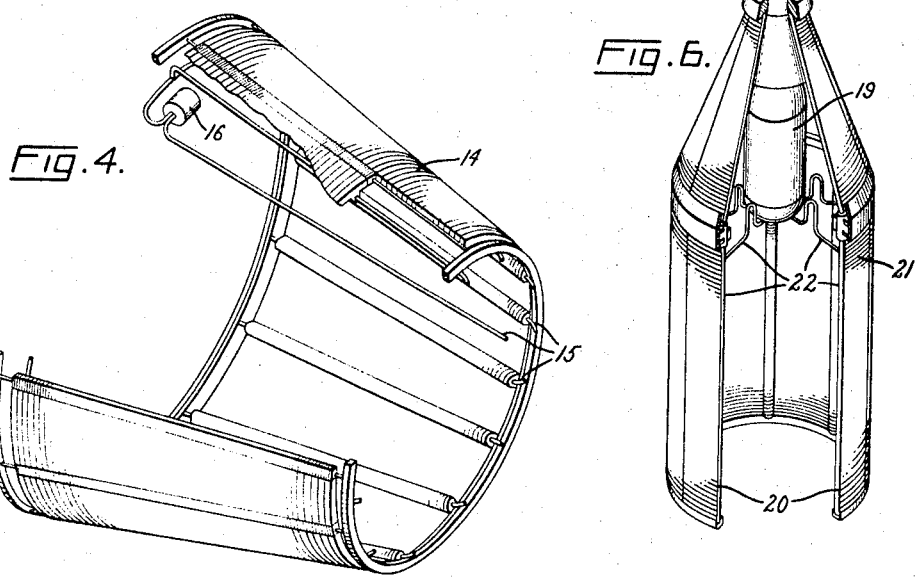
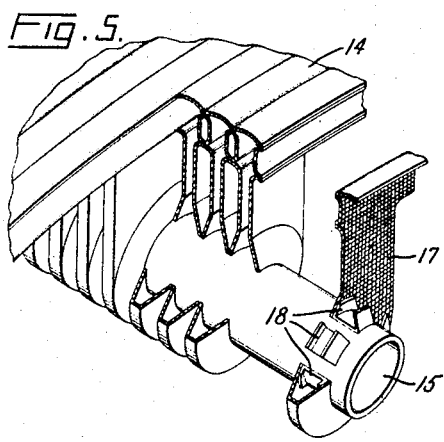
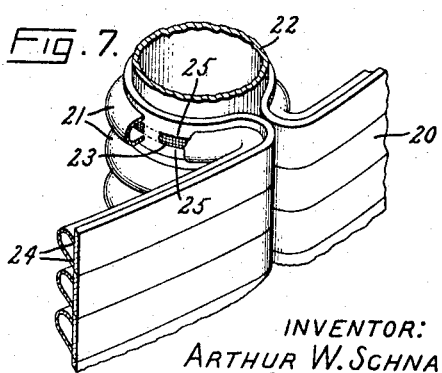

United States Patent Office 3,450,195
Patented June 17, 1969

3,450,195
MULTIPLE CIRCUIT HEAT TRANSFER DEVICE
Arthur W. Schnacke, Cincinnati, Ohio, assignor to General Electric Company, a corporation of New York
Continuation-in-part of application Ser. No. 510,565, Nov. 30, 1965. This application Mar. 16, 1967, Ser. No. 623,733
Int. Cl. F24h *11/06*
U.S. Cl. 165—47          10 Claims

ABSTRACT OF THE DISCLOSURE

Heat exchange devices with high heat transfer-weight efficiency are required for aerospace applications. For this purpose, devices comprised of sealed chambers in which vaporizable heat exchange mediums are transported to vaporization surfaces by capillary transfer means have been suggested. The present invention involves improved designs based on this concept. Generally these improved designs include a multiplicity of sealed chambers, shaped to the outer contours of a space vehicle, with integral ducts therethrough for carrying a fluid to be cooled and a novel capillary pumping means located at the vaporization surfaces.

---

This application is a continuation-in-part of aplication Ser. No. 510,565, Schnacke, filed Nov. 30, 1965, now abandoned, of common assignment herewith.

Introduction

The present invention relates to extremely lightweight and simple heat exchange devices in which heat exchange mediums are cyclically vaporized and condensed, and, as part of this cycle, condensate is transported to a vaporization surface by capillary action.

Background of the invention

For aerospace applications, conventional heat exchange systems in which heat exchange mediums are heated or cooled in tube bundles or finned tube heat exchangers are generally heavy and inefficient, with respect to the quantity of heat transferred per unit weight of the heat exchanger. This heat transfer-weight efficiency may be improved by the use of vaporizable heat exchange mediums, but means for circulating condensate is still required. Gravity or mechanical pumps may be used to circulate condensate but these methods are not suitable for space applications since the former cannot be used in reduced gravity environments, and the latter adds weight to the system. Capillary transfer of condensate has been used but devices utilizing this transfer means have not been sufficiently efficient and practical for use in space.

One of the practical limitations on the utilization, in space, of heat transfer devices in which a vaporizable fluid heat exchange medium is circulated by capillary action, is that usually the condensation surface at which heat must be radiated to the environment is an outer surface of a space vehicle or artificial satellite. As such, it is exposed to environmetnal hazards, such as micrometeorite impact. Yet, in order to enhance thermal conduction and reduce weight, this outer surface must be as light and as thin as possible. The risk of losing an expensive piece of space hardware or having an equipment failure on a manned space flight, due to a single micrometeorite impact on a space heat transfer device of the type heretofore proposed, renders the prior art designs unacceptable.

Further, the effectiveness of earlier designs is limited by the fact that the vaporization surfaces in these designs are generally located at the heat source somewhere in the interior of the vehicle or satellite and the capillary transfer path is thus excessively long.

It is therefore an object of the present invention to provide an improved heat transfer system for reduced gravity environments.

It is also an object of the present invention to provide an improved capillary transfer means for heat transfer devices.

Another object of the present invention is to provide a more efficient, more practical, heat transfer device for space vehicles in which the change in state of a heat exchange medium is utilized.

Still another object of the present invention is to provide a heat exchange device, including a capillary transfer means for condensate heat transfer fluid, which has good heat transfer-weight efficiency, and which is not susceptible to catastrophic failure caused by random micrometeorite impact.

Summary of the invention

These and other objects are met, in accordance with the present invention, by a heat exchange device comprised of a multiplicity of sealed chambers, each having a surface at which heat is given off, the condensation surface, and a surface at which heat is absorbed, the vaporization surface. Disposed within each of the sealed chambers is a vaporizable fluid, hereinafter referred to as the heat exchange medium, which, at the pressure within the chamber, evaporates at the design temperature of the vaporization surface and condenses at the design temperature of the condensation surface. Each of these chambers includes improved means for transferring the condensed heat exchange medium, the condensate, by capillary action, from the condensation surface to the vaporization surface. These improved means, which produce a capillary pumping effect, include capillary condensate supply elements, located adjacent to, but slightly spaced from, discrete sections of the vaporization surface. Preferably, the designs of the heat exchange devices of the present invention are such that normal exterior surfaces of space vehicles and artificial satellites are used as radiating surfaces for giving off heat from an enclosed heat source. The interior sides of these exterior surfaces are condensation surfaces of the heat exchange devices and the hot surfaces of the heat exchange devices form ducts for hot fluids to be cooled by the devices.

Detailed description of the invention

While the specification concludes with claims particularly pointing out and distinctly claiming the subject matter of the present invention, this invention may be better understood from the following description, taken in conjunction with the following drawings, in which:

FIGURE 1 shows a fin-shaped heat radiator suitable for use on space vehicles and artificial satellites;

FIGURE 2 is a detailed view, partially cut-away, of one section of the fin-shaped radiator shown in FIGURE 1;

FIGURE 3 shows the same section as FIGURE 2, in which another form of the present invention is used;

FIGURE 4 illustrates, in partially cut-away view, a space vehicle shroud, which includes, as an integral part thereof, a heat transfer device for cooling a hot fluid;

FIGURE 5 is a detailed view, partially cut-away, of a section of the heat transfer device incorporated in the shroud shown in FIGURE 4;

FIGURE 6 depicts a portion of a space vehicle, with a shroud having an integral heat transfer device slightly different than that shown in FIGURE 4; and FIGURE 7 is a detailed view, partially cut-away, of a section of the heat transfer device incorporated in the shroud shown in FIGURE 6.

Referring more specifically to FIGURE 1, there is shown a fin-shaped device 1 comprising a plurality of sealed chambers 2, having a conduit 3, for hot fluid from which heat is absorbed, and outer surfaces 4, from which heat is radiated.

In FIGURE 2, which is a detailed partially cut-away view of a section of the top two sealed chambers of the fin-shaped heat transfer device of FIGURE 1, there is shown the interior of chambers 2, including, specifically, vaporization surfaces 5, condensation surfaces 6, and chamber separator walls 7. In this design, the intersections of condensation surfaces 6 and separator walls 7 form condensate collection channels 8. This channeling effect is enhanced by the convex shape of condensation surfaces 6. Capillary condensate pump elements 9, each element comprising multiple layer strips of capillary material, are the primary condensate transfer means in this device. Pump elements 9 are attached to vaporization surfaces 5 by spot welds 10. Each pump element 9 is shaped to contact condensate in collection channels 8 and to be coextensive with a portion of vaporization surfaces 5, but slightly spaced therefrom (apart from the areas of spot welds 10) by a distance on the order of 5 to 10 thousandths of an inch. Vapor escape spaces 11 are provided by locating each pump element 9 at some slight distance from adjacent pump elements 9. Typically, pump elements 9 are formed from three layers of 100 to 150 mesh wire screen one inch long and three-quarters of an inch wide and the escape space 11 between these elements is on the order of one-eighth to one-quarter inch.

In the operation of this device, condensate, not shown, collects in channels 8 due to the capillary effect at the intersecting surfaces forming these channels. Movement of condensate from channels 8 to vaporization surface 5 is effected primarily by combined capillary and unidirectional vapor bubble expansion action in pump elements 9. This action depends on heat from hot fluid in conduit 3 causing nucleate boiling of condensate in the space between each pump element 9 and the coextensive portion of vaporization surface 5. As vapor bubbles in this space expand, move outward from the center of elements 9 and burst, two things occur. First a suction is created at the inner surface of the pump element 9 which causes a pump-like enhancement of the capillary movement through pump element 9. Second, it spreads a thin film of condensate over the adjacent vapor escape spaces 11 on vaporization surface 5. This enhance the tendency of the condensate to vaporize and improves the heat transfer efficiency at vaporization surface 5. Vapor leaving vaporization surface 5 is contained within chamber interiors 2 until it condenses on condensation surfaces 6 giving up its heat of vaporization as it does so. This heat is then transmitted to, and radiated from, chamber outer surfaces 4.

Two distinct advantages of this device should be appreciated. First, the use of a multiplicity of sealed chambers conforming to a useful vehicle shape enables it to be used as an integral part of a vehicle. Further, the outer exposed walls may be thin to improve heat conduction from the condensation surface to the radiating surface, and the possibility of catastrophic failure of the device from micrometeorite impact is lessened since only the individual chambers penetrated by a random particle impact will cease to function. Under such circumstances, the remainder of the device will remain operative, and chambers adjacent a punctured chamber will, to some extent, compensate for the punctured chamber by increasing their heat output, his compensating effect is attributed to conductive heat transfer to, and radiation from, the adjacent outer surfaces of inoperative chambers. The second distinct advantage of this device, which may be referred to as the capillary pumping effect, is the simplification and improved effectiveness of the capillary condensate transfer means and the accompanying improvement in the heat transfer efficiency effected by the capillary condensate transfer means, as compared to similar devices of earlier design.

Although the capillary condensate transfer means of this device generally does not require supplementary capillary transfer means, such as wicking material or capillary corrugations, on the inner surfaces of sealed chambers 2, such supplementary capillary transfer means may be required for some purposes. For example, if the device must be capable of operation in a normal gravity environment with conduit 3 in other than a vertical position, channels 8 may be incapable of maintaining a stabilized condensate supply stream to capillary pump elements 9. Then supplementary capillary transfer means will probably be required. Whether such modifications are included in other devices will obviously depend on the design and intended use of the individual device.

The above comments regarding the operation, advantages, and one possible modification, of the design of the present invention shown in FIGURES 1 and 2 are relevant also to the designs shown in FIGURES 3–6, which are described below.

An alternate form of the invention is seen in FIGURE 3, which, like FIGURE 2, is a detailed partially cut-away view of a section of the top two sealed chambers of a heat transfer device having the external configuration shown in FIGURE 1. In particular in FIGURE 3, there is seen a form of the invention differing from that shown in FIGURE 2 by the substitution of angular inserts 12 for the capillary strip type pump elements 9 shown in FIGURE 2. The pumping function of these components is analogous. The combination of angular inserts 12, chamber separator walls 7 and condensation surfaces 6 forms capillary channels 13 in communication with collection channels 8. Capillary channels 13 terminate along vaporization surface 5 where the lip 12a of angular insert 12 diverges from vaporization surface 5 at an angle of about 15 degrees. Typically, shims 12b maintain a space of 15–20 thousandths of an inch between angular inserts 12 and chamber separator walls 7 and 10 thousandths of an inch between angular inserts 12 and vaporization surface 5 at the corner of angular inserts 12. This V-shaped terminus of capillary channels 13 produces a capillary pumping effect, more specifically nucleate boiling, enhanced capillary transfer, and improved heat transfer, at the adjacent vapor escape spaces 11 of vaporization surfaces 5 in the same manner as described with respect to the capillary pump elements shown in FIGURE 2.

In FIGURE 4 there is shown the present invention in another form. As shown, a plurality of sealed chambers 14, form a shroud or circular outer surface in intimate contact with hot fluid ducts 15. In this embodiment, in which the hot fluid carried by ducts 15 is a metal, circulation of the hot fluid is effected by an electromagnetic pump 16.

In FIGURE 5 is seen, a detailed view, partially cutaway, of the sealed heat transfer chambers 14 in the shroud shown in FIGURE 4. In particular, there is seen a cross section of some of the sealed chambers showing one cross sectional shape which has been found to be effective in devices of this type. Capillary material 17 is disposed on all of the inner surfaces of the sealed chambers 14 to assist in the transfer of condensate by capillary pumping means 18, which are similar in function and design to those shown in FIGURE 2, from the condensation surface of sealed chambers 14 into contact with the hot fluid duct 15.

In FIGURE 6 is shown a space vehicle with a nuclear power plant 19 and a partially cut-away shroud 20 comprised of integral sealed heat transfer chambers 21 in contact with hot fluid ducts 22. A detailed view, partially cut-away, of the integral sealed heat transfer chambers 21 and the hot fluid duct 22, both incorporated in the shroud 20, is seen in FIGURE 7. A strip-type capillary pumping means 23 extends around the circumference of hot fluid duct 22 and into contact with condensate collection channels 24. The vapor escape space in this embodiment is the exposed vaporization surface 25 on either side of strip-type capillary pumping means 23.

With regard to specific materials, the heat exchange device of the present invention are generally formed from stainless steel or other suitable heat conducting material; the heat transfer fluids are selected with regard to several factors including the conductivity and heat capacity of the fluid and the design temperatures of the device. Sodium, other alkali metals, and other metals generally are typical of the heat exchange mediums which may be used in the present invention.

While the present invention has been described with reference to particular embodiments thereof for purposes of clarity and convenience, it should be understood that numerous modifications may be made by those skilled in the art without departing from the invention's true spirit and scope. It should be further understood that while the individual elements thereof, such as the capillary pumping means, are described with reference to aerospace applications, this invention may be utilized in other environments, such as conventional evaporative heat exchangers, sea-water distillation units, etc. Therefore the appended claims are intended to cover all such equivalent variations as come within the true spirit and scope of the present invention.

What I claim as new and desire to secure by Letters Patent of the United States is:

1. A heat exchange device comprising a multiplicity of sealed chambers, each of said sealed chambers including a vaporizable heat exchange fluid, a vaporization surface and a condensation surface on the interior thereof, and a means for transporting, primarily by capillary action, condensate formed on said condensation surface to said vaporization surface, wherein said capillary transfer means comprises a capillary pumping means, said pumping means including a capillary path from said condensation surface to said vaporization surface, said path terminating adjacent a vapor expansion and escape space on said vaporization surface, said vapor expansion and escape space including an area on said vaporization surface exposed to the interior of said heat exchange device from which the escape of vapors is substantially unimpeded and, interposed between said capillary path terminus and said exposed area on said vaporization surface, a second area on said vaporization surface, said second area having an overly slightly spaced and diverging from said vaporization surface, said divergence opening onto said exposed area of vaporization surface, said overlay being an extension of said capillary transfer means.

2. A device, as recited in claim 1, wherein said sealed chambers form an integral part of the outer surface of a space vehicle.

3. A device, as recited in claim 1, wherein each of said condensation surfaces intersects adjoining walls of each respective sealed chamber in an acute angle to form condensate collection channels at said intersections.

4. A device, as recited in claim 3, wherein said capillary paths and said vapor expansion and escape spaces are formed by members defining capillary channels from said condensate collection channels to said vaporization surfaces, said channel-defining members diverging slightly from said vaporization surfaces at the terminations of said defined channels to form said vapor expansion and escape spaces.

5. A device, as recited in claim 3 wherein said capillary paths and said vapor expansion and escape spaces comprise strips of capillary material coextensive with discrete portions of said vaporization surfaces, said strips contacting said surface at points of attachment therebetween along a line extending in the general direction of travel of liquid from said condensate collection channels to said surface, said strips being slightly spaced from said surface apart from said line of attachment, wherein the adjacent, non-coextensive portions of said vaporization surfaces remain exposed to the main interior spaces of said sealed chambers.

6. A device, as recited in claim 5, wherein said strips of capillary material comprise multiple layers of fine mesh screen.

7. Means for transferring a liquid from a supply thereof to a surface at which said liquid is vaporized, said means comprising a capillary transfer means in contact with said vaporization surface, said transfer means terminating at a vapor expansion space which opens into an exposed portion of said vaporization surface, said vapor expansion space defined by an area on said vaporization surface between said capillary transfer means terminus and said exposed portion of vaporization surface, said area having an overlay slightly spaced and divergent from said vaporization surface, said overlay being an extension of said capillary transfer means.

8. Means, as in claim 7, wherein said capillary transfer mean comprises a capillary channel with a divergent terminus comprising said vapor expansion space.

9. Means, as in claim 7 wherein said capillary transfer means and said vapor expansion space comprise a strip of capillary material attached along a line extending in the general direction of liquid movement to said vaporization surface, said strip, apart from said line of attachment, being slightly spaced from said vaporization surface.

10. Means, as in claim 9, wherein said strip of capillary material comprises multiple layers of fine mesh screen attached to said vaporization surface by spot welds.

References Cited

UNITED STATES PATENTS

| | | | |
|---|---|---|---|
| 3,152,774 | 10/1964 | Wyatt | 244—1 |
| 3,229,759 | 1/1966 | Grover | 165—105 |
| 3,239,164 | 3/1966 | Rapp | 165—105 X |

ROBERT A. O'LEARY, *Primary Examiner.*

A. W. DAVIS, JR., *Assistant Examiner.*

U.S. Cl. X.R.

165—105; 244—1